(12) United States Patent
McKeithan, II et al.

(10) Patent No.: US 11,079,893 B2
(45) Date of Patent: Aug. 3, 2021

(54) REMOTELY RESTRICTING CLIENT DEVICES

(71) Applicant: AirWatch LLC, Atlanta, GA (US)

(72) Inventors: Kevin Marshall McKeithan, II, Fort Worth, TX (US); William DeWeese, Haltom City, TX (US)

(73) Assignee: AirWatch LLC, Atlanta, GA (US)

( * ) Notice: Subject to any disclaimer, the term of this patent is extended or adjusted under 35 U.S.C. 154(b) by 1023 days.

(21) Appl. No.: 14/687,564

(22) Filed: Apr. 15, 2015

(65) Prior Publication Data
US 2016/0306514 A1    Oct. 20, 2016

(51) Int. Cl.
| | | |
|---|---|---|
| G06F 3/0481 | (2013.01) | |
| G06F 21/10 | (2013.01) | |
| H04L 29/06 | (2006.01) | |
| H04W 12/37 | (2021.01) | |
| H04W 88/02 | (2009.01) | |
| H04W 12/08 | (2021.01) | |

(52) U.S. Cl.
CPC ............ *G06F 3/0481* (2013.01); *G06F 21/10* (2013.01); *H04L 63/105* (2013.01); *H04W 12/37* (2021.01); *H04L 67/42* (2013.01); *H04W 12/08* (2013.01); *H04W 88/02* (2013.01)

(58) Field of Classification Search
CPC ..... G06F 21/10; G06F 3/0484; H04L 63/105; H04L 67/42; H04W 12/08; H04W 88/02
See application file for complete search history.

(56) References Cited

U.S. PATENT DOCUMENTS

| | | | | |
|---|---|---|---|---|
| 8,548,443 | B2* | 10/2013 | Anson | H04W 4/021 455/410 |
| 9,195,388 | B2* | 11/2015 | Shepherd | G06F 21/6218 |
| 9,473,417 | B2* | 10/2016 | Reagan | H04L 47/70 |
| 10,073,720 | B2* | 9/2018 | Raman | H04L 9/3247 |
| 2002/0196789 | A1* | 12/2002 | Patton | H04L 1/188 370/400 |
| 2006/0147891 | A1* | 7/2006 | Dreyfous | G09B 5/00 434/362 |
| 2007/0156693 | A1* | 7/2007 | Soin | G06F 21/604 |
| 2009/0282473 | A1* | 11/2009 | Karlson | H04L 63/102 726/17 |
| 2010/0235881 | A1* | 9/2010 | Liu | G06F 9/545 726/3 |

(Continued)

OTHER PUBLICATIONS

LanSchool User Guide v7.7 2013 (Year: 2013).*

(Continued)

*Primary Examiner* — Andrea N Long
(74) *Attorney, Agent, or Firm* — Thomas | Horstemeyer LLP

(57) ABSTRACT

Disclosed are various examples for remotely restricting client devices. A client device can be placed into a restricted mode in which application switching capabilities of the client device are disabled. Additionally, the client device can transmit screen capture data to a management service, which can provide the ability for an administrator user to monitor data shown on a display associated with the client device. The client device can also be removed from the restricted mode in response to a command sent from the management service to the client device.

20 Claims, 13 Drawing Sheets

(56) References Cited

U.S. PATENT DOCUMENTS

| | | | | |
|---|---|---|---|---|
| 2012/0321144 | A1* | 12/2012 | Choong | G06F 21/32 382/118 |
| 2013/0173776 | A1* | 7/2013 | Kang | H04L 63/02 709/223 |
| 2013/0254401 | A1* | 9/2013 | Marshall | G06F 21/6218 709/226 |
| 2014/0280934 | A1* | 9/2014 | Reagan | H04L 47/70 709/225 |
| 2015/0188838 | A1* | 7/2015 | Bhattacharya | G09B 5/00 709/225 |
| 2015/0319293 | A1* | 11/2015 | Cerda | H04W 48/04 455/418 |
| 2016/0291915 | A1* | 10/2016 | Panchapakesan | G06F 3/017 |
| 2017/0195404 | A1* | 7/2017 | Montgomery | H04L 67/10 |

OTHER PUBLICATIONS

Anand Khanse Disable access to, or Turn off Windows Store in Windows 8.1 Jul. 7, 2014 (Year: 2014).*

The Instructional "Parental Controls With iOS Restrictions" Feb. 18, 2014 17 pages (Year: 2014).*

* cited by examiner

REMOTELY RESTRICTING CLIENT DEVICES

BACKGROUND

In an enterprise environment, a management service can manage client devices that are associated with various user accounts. Client devices may communicate with the management service through various types of network connections, such as wired or wireless carriers, private networks, or over the public Internet. It can be desirable to restrict certain functionality of the client devices in some scenarios. For example, in a classroom or testing environment, a teacher or test proctor may wish to restrict client devices from accessing unauthorized applications or data.

In a scenario in which students are being administered a test or examination, a test proctor may wish to ensure that students can only access authorized applications, such as the application that is used to administer the test. In a classroom setting, a teacher may wish to ensure that students do not access unauthorized applications or data that may be irrelevant to instructional materials related to a class.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to placing one or more client devices, such as a laptop computer, a desktop computer, a mobile device, or any other computing system, into a restricted mode that disables certain functionality of a particular client device. For example, in a classroom or exam setting, students or test takers may be administered an exam on a computer, but it may be desired to assure that students or test takers do not access unauthorized information or execute unauthorized applications. In one scenario, a test may be administered on computers using an application in which the test is taken by a test-taker. It may be desired to limit or eliminate the ability of a test-taker to execute other applications that may be stored on or accessible to the computer to reduce the possibility of the test-taker accessing unauthorized information or unauthorized applications. In other words, it may be desired to effectively lock the computer into executing only the particular application through which the test can be taken.

Accordingly, examples of the present disclosure provide the ability of an administrator, teacher, test proctor, or any other authorized user to place a client device in a restricted mode that can limit the ability of the client device to execute other applications or access unauthorized information using a web browser or other applications. In examples of the present disclosure, an administrator may also remove the client device from a restricted mode, which enables the ability of the client device to execute other applications or access information through a browser.

Examples of the disclosure can also provide a management console that provides a user interface in which client devices can be remotely administered by an administrator. Additionally, the management console can provide one or more screen captures so that a display of the client device can be viewed or monitored by an administrator when the client device is in the restricted mode. Other examples and variations are discussed in further detail herein.

Figure 1:
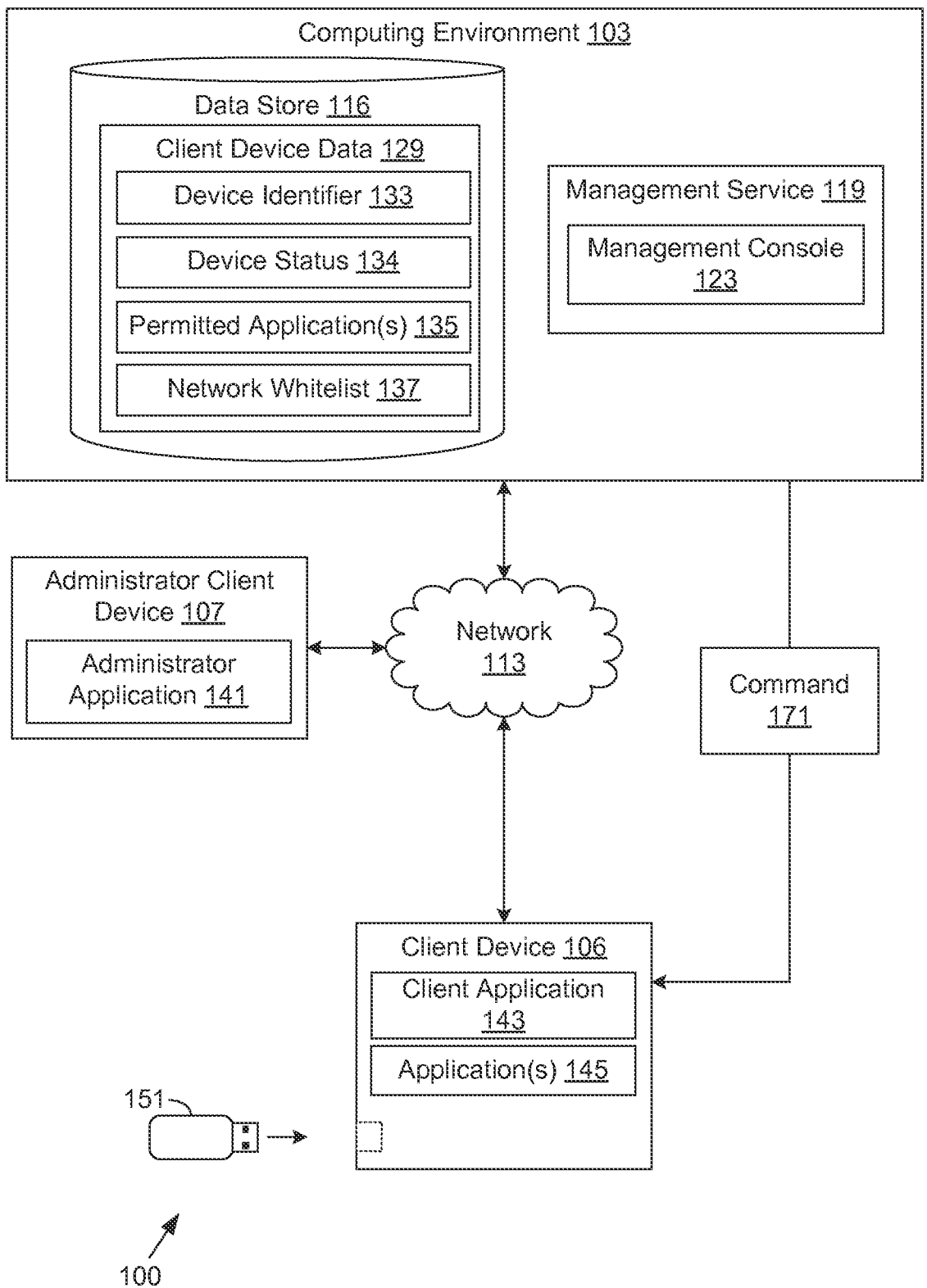
FIG. 1 is a drawing of a networked environment according to various examples.

With reference to FIG. 1, shown is a networked environment 100 according to various examples. The networked environment 100 shown in FIG. 1 includes a computing environment 103, a client device 106, an administrator client device 107, and potentially other components, which are in data communication over a network 113. The network 113 includes, for example, the Internet, one or more intranets, extranets, wide area networks (WANs), local area networks (LANs), wired networks, wireless networks, other suitable networks, or any combination of two or more such networks. The networks may include satellite networks, cable networks, Ethernet networks, telephony networks, and/or other types of networks.

The computing environment 103 may include, for example, a server computer or any other system providing computing capabilities. Alternatively, the computing environment 103 may employ multiple computing devices that may be arranged, for example, in one or more server banks, computer banks, or other arrangements. The computing devices may be located in a single installation or may be distributed among many different geographical locations. For example, the computing environment 103 may include multiple computing devices that together form a hosted computing resource, a grid computing resource, and/or any other distributed computing arrangement. In some cases, the computing environment 103 may operate as at least a portion of an elastic computing resource where the allotted capacity of processing, network, storage, or other computing-related resources may vary over time. The computing environment 103 may also include or be operated as one or more virtualized computer instances. Generally, the computing environment 103 is operated in accordance with particular security protocols such that it is considered a trusted computing environment. The data stored in the data store 116 is associated with the operation of the various components described below.

A management service 119 and/or other systems may be executed in the computing environment 103. The management service 119 may be executed to manage and/or oversee the operation of multiple client devices 106. In some examples, an enterprise, such as one or more companies or other organizations, may operate the management service 119 to oversee and/or manage the operation of the client devices 106 of students, test-takers, or any other users for whom it is desired to place client devices 106 into a restricted mode.

The management service 119 may include a management console 123 and/or other components. The management service 119 may manage and/or oversee the operation of multiple client devices 106. For example, the management service 119 can facilitate ensuring that client devices 106 that are administered by the management service 119 are operating in compliance with various compliance rules. In one scenario, the management service 119 can issue commands to cause a client device 106 to enter or exit from a restricted mode in which one or more capabilities of the client device 106 are restricted or disabled.

The management console 123 may facilitate administration of client devices 106 by administrators via the management service 119. For example, the management console 123 may generate one or more user interfaces that are rendered on a display device of a computing device to facilitate interaction with the management service 119. The user interfaces may facilitate an administrator inputting commands or other information for the management service 119. For example, a user interface can be generated by the management console 123 and delivered to another computing device and rendered by a browser or a special purpose application executed by the other computing device. Additionally, the user interfaces may include presentations of statistics or other information regarding the client devices 106 that are managed by the management service 119. In some examples, the management console 123 can provide a user interface accessible by an administrator through which the administrator may enroll, activate, remove, deactivate, or otherwise manage devices that are configured as client devices 106. These client devices 106 can be remotely placed into a restricted mode by the management service 119. The user interface can also allow an administrator to view screen captures associated with a client device 106, which can include a video feed or images corresponding to content that is displayed on a display device associated with or coupled to a client device 106. In this example, the client device 106 can be executing a client application providing screen captures to the management service 119.

The data stored in the data store 116 includes, for example, client device data 129 and potentially other data. The client device data 129 can include information about particular client devices 106 that are registered with the management service 119 as managed or enrolled devices. A managed or enrolled device includes devices that the management service 119 can place in a restricted mode as well as monitor content displayed by the client device 106.

Client device data 129 can maintain a device identifier 133 associated with a particular client device 106. A device identifier 133 can uniquely identify a particular client device 106 with respect to other client devices 106 managed by the management service 119. Client device data 129 can also include a device status 134 for a particular client device 106. The device status 134 can indicate whether the client device 106 is in a restricted mode or an unrestricted mode. The device status 134 can also store screen capture data obtained from a client device 106 reflecting data shown on a display of the client device 106 as well as usage of a particular application by the client device 106.

Client device data 129 can further include an identity of one or more permitted applications 135 that can be executed by a client device 106 in a restricted mode. The management service 119, in order to place a client device 106 in a restricted mode, can transmit a command that identifies one or more permitted applications 135, such as a particular test-taking application, a browser, or any other application executable by the client device that the client device 106 is instructed to launch when entering the restricted mode. The data related to permitted applications 135 can also identify one or more arguments associated with launching a particular application by the client device 106. For example, execution of a permitted application 135 can also be associated with arguments that place an executed permitted application 135 into a particular mode of operation. As one scenario, an argument can include a switch or other parameter that launches the application in a full-screen mode, a mode that disables a browser address bar, or a mode that disables an ability to follow hyperlinks. The parameter can also include an instruction to launch a browser application and open a particular website or include any other arguments that can modify operation of the browser.

Client device data 129 can also include a network whitelist 137 that can be associated with a restricted mode of a client device 106. A network whitelist 137 can identify certain network addresses, domains, or other network locations that a browser or any other application executed by the client device 106 in a restricted mode may access. For example, during administering of a test, the network whitelist 137 can be transmitted to the client device 106 and identify a particular network address at which testing content is located. The network whitelist 137 can also identify that access to other network addresses, such as other websites on the Internet, is not permitted. In some scenarios, rather than a whitelist, the network whitelist 137 can comprise a blacklist that only identifies network addresses, domains, or other network locations that a client device 106 may not access in a restricted mode.

The client device 106 is representative of multiple client devices 106 that may be coupled to the network 113. For example, multiple client devices 106 can be a fleet of devices in a classroom setting, an educational setting, or any other setting in which the devices may be clustered together in a particular location or located across many different locations. The client device 106 may comprise, for example, a processor-based system such as a computer system. The computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display as well as one or more input devices, such as a mouse or touch pad that facilitates a user input or other types of data input into the client device 106.

The client device 106 may be configured to execute a client application 143, other applications 145, and/or other components. The client device 106 can execute client application 143 to place a client device 106 in a restricted mode and remove the client device 106 from the restricted mode. In one scenario, an administrator or other authorized user can install the client application 143 on a client device 106. The client application 143 can also be placed in a startup folder or other location on the client device 106 that causes the client device 106 to execute upon startup of the client device. The client application 143 can also be executed in an administrator mode, a superuser mode, or with elevated privileges so that it can exercise some degree of control over the client device 106 to facilitate placing the client device 106 in a restricted mode.

Additionally, the client application 143 may run as a background process in the client device 106 and/or without user intervention. The client application 143 can communicate with the management service 119 to facilitate the management service 119 managing the client device 106. For example, the client application 143 can obtain compliance rules from the management service 119, and the client application 143 can determine whether the client device 106 is operating in accordance with those compliance rules. In another example, the client application 143 can transmit data that indicates the status of settings for the client device 106, and the management service 119 uses this data to determine whether the client device 106 is operating in accordance with compliance rules. If it is determined that the client device 106 is not in compliance with one or more compliance rules, the client application 143 or the management service 119 can cause a remedial action to be performed. Examples of remedial actions include notifying a user of the device or an administrator of the management service 119, causing device settings to be changed so that the client device 106 becomes compliant with the compliance rules, and erasing data from the client device 106.

The client application 143, upon execution, can transmit a request to register the client device 106 with the management service 119. The request can include a device identifier 133 associated with the client device 106, a network address associated with the client device 106, or other identifying information. The client application 143 can also provide updated network address information with respect to the client device 106 to the management service 119 should the network address of the client device 106 change. In this way, the management service 119 can issue a command to place the client device 106 in a restricted mode even if the network address of the client device 106 changes over time.

To facilitate placing a client device 106 in a restricted mode, the client application 143 can perform one or more actions. The client application 143 can launch a particular application identified by the management service 119 that is received in a command 171 from the management service 119. The client application 143 can identify an application that is permitted by the management service 119 from the command to place the client device 106 in a restricted mode. The client application 143 can then launch the permitted application on the client device 106. The client application 143 can also disable an application switching capability of the client device 106 or an operating system executed by the client device 106. In one scenario, the client application 143 can disable an ability of the client device 106 to switch a foreground application on a client device 106 to an application other than a permitted application. In one example, the client application 143 can disable an application switching capability of the client device 106 by editing a system registry associated with an operating system of the client device 106 to disable a feature of the operating system that allows for a user to change an application that is executing in the foreground.

As another example, the client application 143 can disable an application switching capability of the client device 106 by disabling a task manager executed by the client device 106 or an operating system executed by the client device 106. The task manager is an application or a utility that provides information about various applications, services, or processes executed by the client device 106. In some instances, the task manager can provide a user with the ability to launch or cease execution of other applications, services, or processes. Accordingly, to disable the application switching capability of the client device 106 by disabling the task manager, the client application 143 can kill or cease execution of the task manager. In some scenarios, the client application 143 can edit a system registry of the client device 106 to prevent execution of the task manager.

As another example, the client application 143 can disable a file explorer or a shell of the client device 106 that is provided by an operating system executed by the client device 106. A file explorer or a shell is an application or a utility that provides access to a file system of the client device 106. In some instances, the file explorer or shell can provide the ability for a user to access files, launch applications or access other system resources of the client device 106. Accordingly, to disable the file explorer or shell, the client application 143 can kill or cease execution of the file explorer or shell. In some scenarios, the client application 143 can edit a system registry of the client device 106 to prevent execution of the file explorer or shell.

The client application 143 can also modify the network settings of the client device 106 to enforce a network whitelist 137 received from the management service 119. The client application 143 can be configured to capture information on a display of the client device 106 or generate screen captures. The screen captures can be transmitted to the management service 119 and can include a video feed or imagery captured from a sampling of data displayed on the display of the client device 106. In this way, the client application 143 can facilitate monitoring information displayed by the client device 106.

The client application 143 can also remove the client device 106 from the restricted mode by enabling the application switching capabilities of the client device 106 as well as potentially ceasing capture and transmission of screen captures. In one scenario, the client application 143 can remove the client device 106 from the restricted mode in response to receiving a command from the management service 119. The client application 143 can authenticate the command by determining whether a particular password is embedded within the command or verifying an originating network address associated with the command. The client application 143 can also perform other authentication procedures and it should be appreciated that above examples are merely illustrative. The client application 143 can also remove the client device 106 from a restricted mode if an administrator password is entered locally on the client device 106. For example, the client application 143 may provide an administrator with the ability to perform an administrator override through a user interface presented on the client device 106 in order to manually remove the client device 106 from the restricted mode.

The client device 106 can also include a peripheral interface through which an administrator device 151 can communicate. The interface may include a removable peripheral interface such as a universal serial bus (USB) interface, and the administrator device 151 can be a removable storage device, such as a USB key or USB drive. The interface may also include a wireless interface, such as a Bluetooth communication network or any other personal area network communication interface. An administrator device 151 can be presented at the client device 106 to facilitate removal of the client device 106 from the restricted mode. For example, to remove the client device 106 from the restricted mode, an administrator can insert an administrator device 151, such as a USB key, into the USB drive of the client device 106. The client application 143 can detect an operating system event associated with proximity of the administrator device 151 to the client device 106, such as a USB insertion event triggered by the operating system. The client application 143 can then determine whether the administrator device 151 presents a correct administrator password or other security key to the client application 143. In response to verifying such a password or security key, the client application 143 can then remove the client device 106 from the restricted mode.

The application 145 represents one or more applications 145 that are stored on the client device 106 and executable by the client device 106. For example, an application 145 may include a browser application, a test-taking application, or any other software executable by the client device 106. Such an application 145 can be executed in a restricted mode if the application is a permitted application that is identified by a command to place the client device 106 in the restricted mode.

The administrator client device 107 is representative of one or more computing devices that may be coupled to the network 113. The administrator client device 107 may include, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display as well as one or more input devices, such as a mouse or touch pad that facilitates a user input or other types of data input into the administrator client device 107.

The administrator client device 107 can execute an administrator application 141, which can represent a browser application or a special purpose application that can render a user interface provided by the management console 123. The user interface can be presented to an administrator, instructor or test proctor in order to facilitate placing client devices 106 into a restricted mode or removal of client devices 106 from the restricted mode.

Next, a description of examples of the operation of the various components in the networked environment 100 is provided. To begin, a client application 143 can be executed on a client device 106 with sufficient privileges to facilitate disabling application switching capabilities of the client device 106. The client application 143 can generate and transmit a request to register the client device 106 with the management service 119. The request can include a device identifier 133 as well as potentially an identifier that identifies a particular class, classroom, exam, user group, or any other identifying information that facilitates classification or categorization of the client device 106. The identifier can also identify a group of users organized according to roles within an organization or company. For example, a group of users belonging to a specific class of employee or contractor can be administered an exam or a presentation during which it is desired that the users be restricted from accessing authorized content or applications.

The management service 119 can then generate a user interface through the management console 123, which is rendered by the administrator application 141. The user interface can identify the various client devices 106 available to be placed in a restricted mode as well as user interface elements that facilitate placing a particular client device 106 in a restricted mode. In response to receiving a request to place a particular client device 106 in the restricted mode via the user interface, the management service 119 can generate and transmit a command 171 to the client device 106. The command 171 can instruct the client application 143 to place the client device 106 in a restricted mode. The command 171 can identify permitted applications 135, a network whitelist 137, a command to execute a particular permitted application 135, and a command to disable application switching capability.

The command 171 can also instruct the client application 143 to initiate screen capture and transmission of screen captures to the management service 119. The user interface presented via the management console 123 can provide the ability of an administrator to view the screen captures on the administrator client device 107.

The management service 119 can also obtain a request to remove a particular client device 106 from a restricted mode through the user interface. In response to receiving such a request, the management service 119 can generate a command to remove the client device 106 from the restricted mode, which can be transmitted to the client application 143 via the network 113. In some scenarios, the request can also originate from the client application 143 in response to an administrator override through entry of a password or detection of the presence of the administrator device 151 in proximity to the client device 106. In yet another scenario, a request to remove the client device 106 from the restricted mode can originate from the client application 143 in response to detection of completion of an exam, a test, or any other task within the client application 143. The client application 143 can transmit a status confirmation confirming removal of the client device 106 from the restricted mode, and the management service 119 can update the management console 123 user interface with the status of the client device 106 accordingly.

In some scenarios, the command 171 to place the client device 106 in the restricted mode can also originate from the administrator client device 107. In this scenario, the management service 119 can delegate the ability to place client devices 106 into the restricted mode to the administrator client device 107. In some examples, the administrator application 141 can transmit a request for authorization to manage a client device 106 or a set of client devices 106 to the management service 119. The management service 119 can authenticate the administrator application 141 or a user of the administrator application 141. Upon authentication of the administrator application 141 or a user of the administrator application 141, the management service 119 can transmit an authorization to the administrator application 141 that delegates the ability to place client devices 106 into a restricted mode. In one example, to delegate the ability to place client devices 106 into a restricted mode, the management service 119 can provide an authentication credential the administrator application 141, which the administrator application 141 can provide to client devices 106. The client application 143 can in turn authenticate whether the administrator application 141 has the authority to place the client device 106 into a restricted mode by authenticating the authentication credential. If the client application 143 receives an authenticated command from the administrator application 141 to place the client device 106 into a restricted mode, the client application 143 can act on the command. Similarly, the client application 143 can also remove the client device 106 from the restricted mode if it receives an authenticated request to do so from the administrator application 141.

Figure 2A:
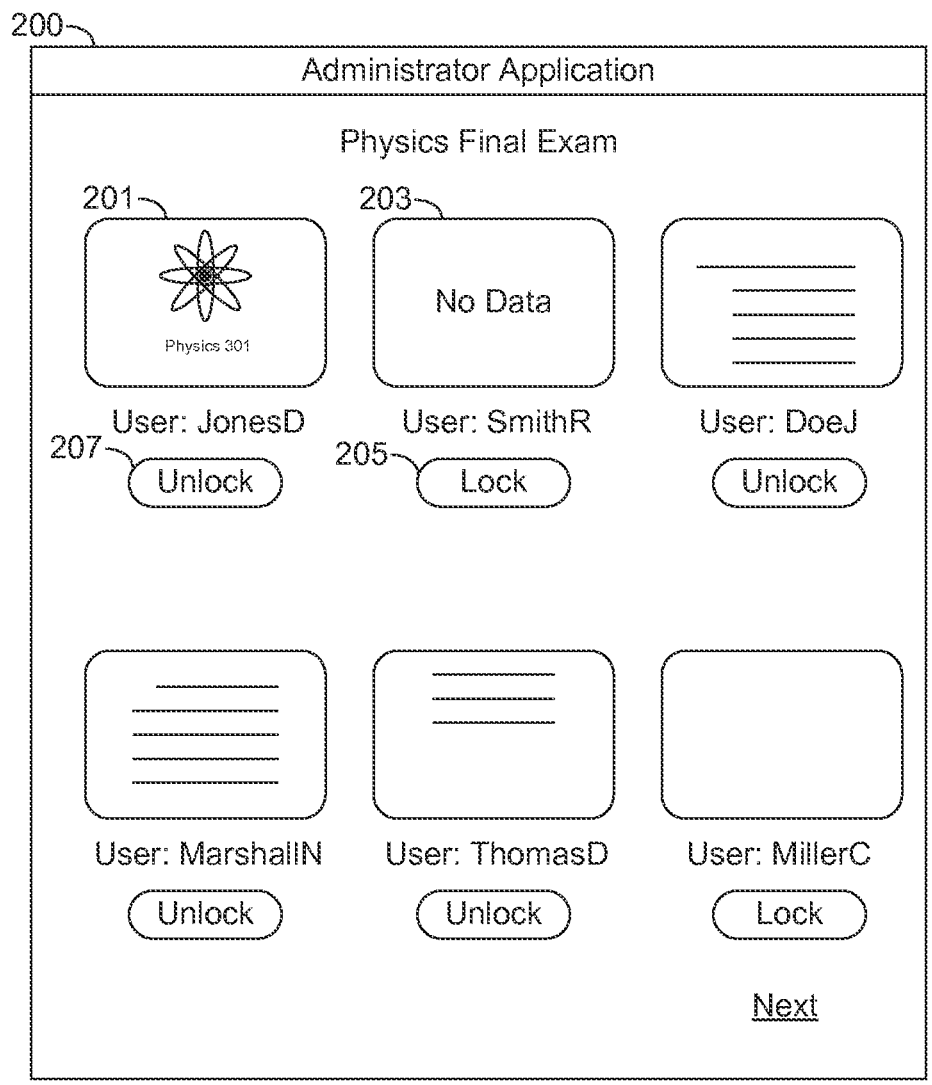
FIG. 2A is an example user interface rendered by an administrator application.

Referring now to FIG. 2A, an example user interface 200 is shown. The user interface 200 can be generated by the administrator application 141. Alternatively, the management console 123 can generate and transmit the user interface 200 to the administrator application 141, which can render the user interface 200 on the administrator client device 107. As shown in FIG. 2A, the user interface 200 can include a user interface element 201 that allows an administrator to view screen capture data that corresponds to a client device 106 that is in a restricted mode. For a client device 106 that is registered with the management service 119 but has not been placed into a restricted mode, the management service 119 can suppress screen capture data for the client device 106 in user interface element 203. Additionally, the user interface 200 can include user interface element 205 that allows an administrator to place a client device 106 corresponding to the user interface element 205 into a restricted mode. In one example, the administrator application 141 or management service 119 can transmit a command 171 that places a client device 106 into a restricted mode when a user activates the user interface element 205. The client application 143 can also transmit screen capture data that can be populated within user interface element 203. Additionally, in the example of FIG. 2A, the administrator application 141 or management service 119 can transmit a command 171 that removes a client device 106 from a restricted mode when a user activates the user interface element 205.

Figure 2B:
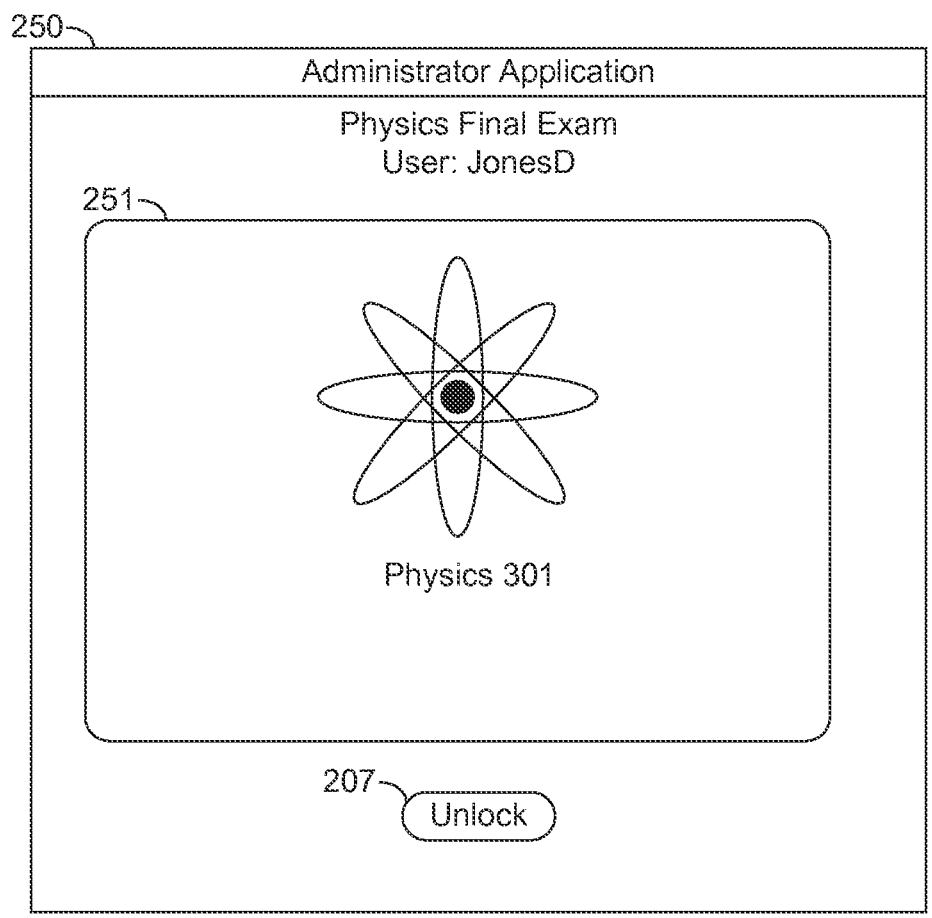
FIG. 2B is an alternative example user interface rendered by the administrator application.

The user interface 200 can also allow an administrator to activate an expanded or full-screen view of capture data from a client device 106 in a restricted mode. In one example, the administrator can tap or click on user interface element 201 to view an expanded or full-screen view of the capture data. Therefore, reference is now made to FIG. 2B, which illustrates an additional user interface 300 that can be generated by the management service 119 or administrator application 141. The user interface 300 can include an expanded or full-screen view 251 of the capture data or information shown on a display of a client device 106 that is in the restricted mode. In this way, an administrator can monitor the content that is being viewed by a user of the client device 106. Additionally, an administrator can also initiate a command that removes the client device 106 from the restricted mode or by activating user interface element 207.

Figure 3:
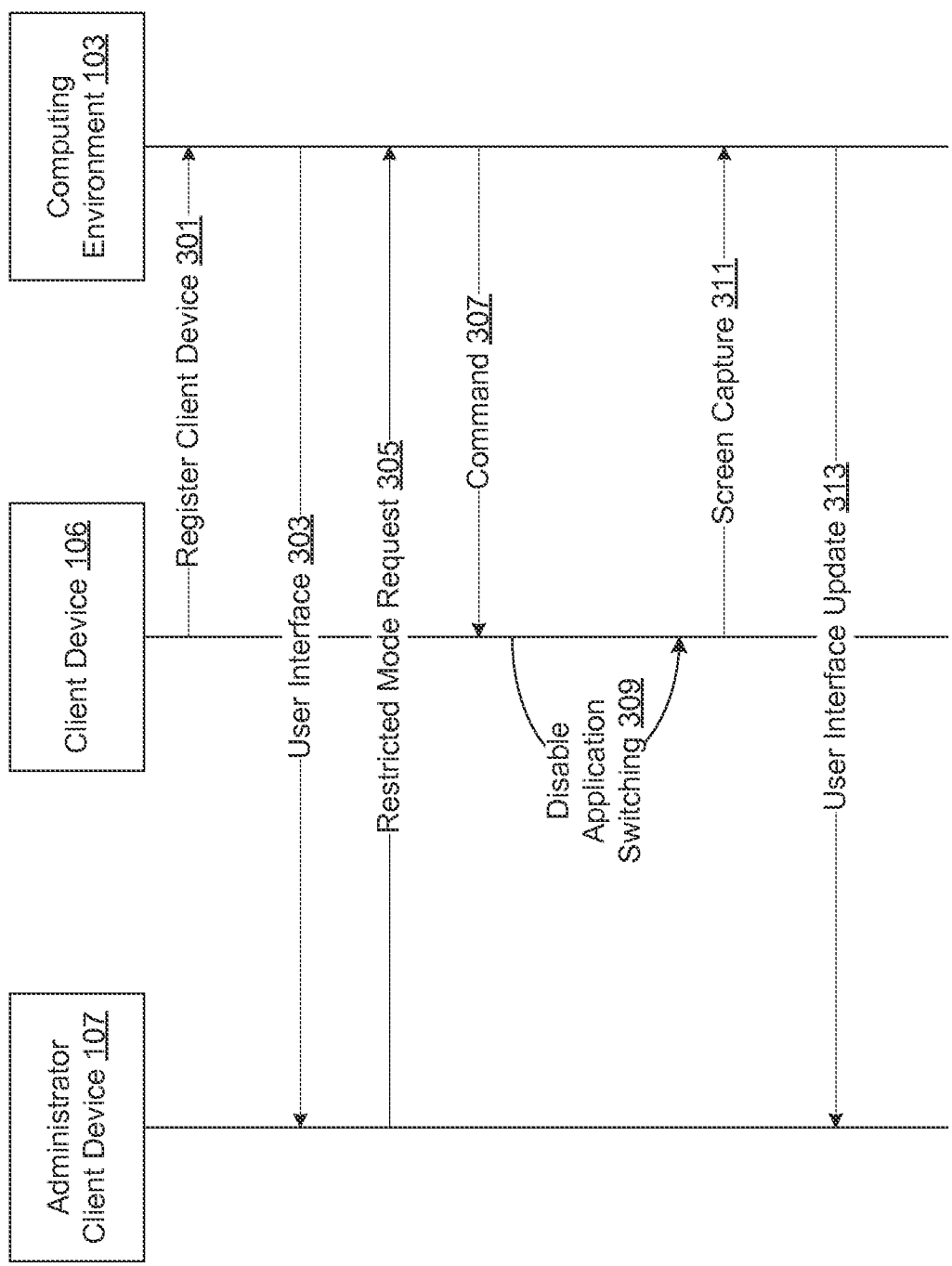
FIG. 3 is a sequence diagram illustrating interactions according to various examples.

Reference is now made to FIG. 3, which depicts a sequence diagram illustrating one example of interactions between a computing environment 103, a client device 106 and an administrator client device 107. FIG. 3 illustrates an example of a client device 106 obtaining a command 171 to place a client device 106 in a restricted mode. As denoted by step 301, the client device 106, via the client application 143, can transmit a request to register or enroll the client device 106 with the management service 119. The request to register or enroll the client device 106 can also initiate installation of the client application 143 on the client device 106. The request can also push a management profile or other settings to the client device 106 that facilitate the restricted mode. In response to receiving such a request, the management service 119 can update a management console 123 user interface to reflect that the client device 106 is available to be placed into a restricted mode by the management service 119 as shown by step 303.

Next, at step 305, the administrator client device 107 can obtain a request from an administrator user to place the client device 106 into the restricted mode in which application switching capability is disabled. At step 307, the management service 119 can generate a command 171 instructing the client application 143 to place the client device 106 into the restricted mode. At step 309, the client application 143 can place the client device 106 into the restricted mode by disabling the application switching capabilities of the client device 106. At step 311, the client application 143 can transmit screen captures associated with data shown on a display of the client device 106 to the management service 119. The screen captures can be used to generate an administrator user interface in which the content displayed by a client device 106 can be monitored or viewed by an administrator. At step 313, the management service 119 can update the management console 123 to reflect that the client device 106 has been placed into the restricted mode. Additionally, the management console 123 can provide screen capture data if the administrator user activates user interface elements requesting to view screen captures associated with the client device 106.

Figure 4:
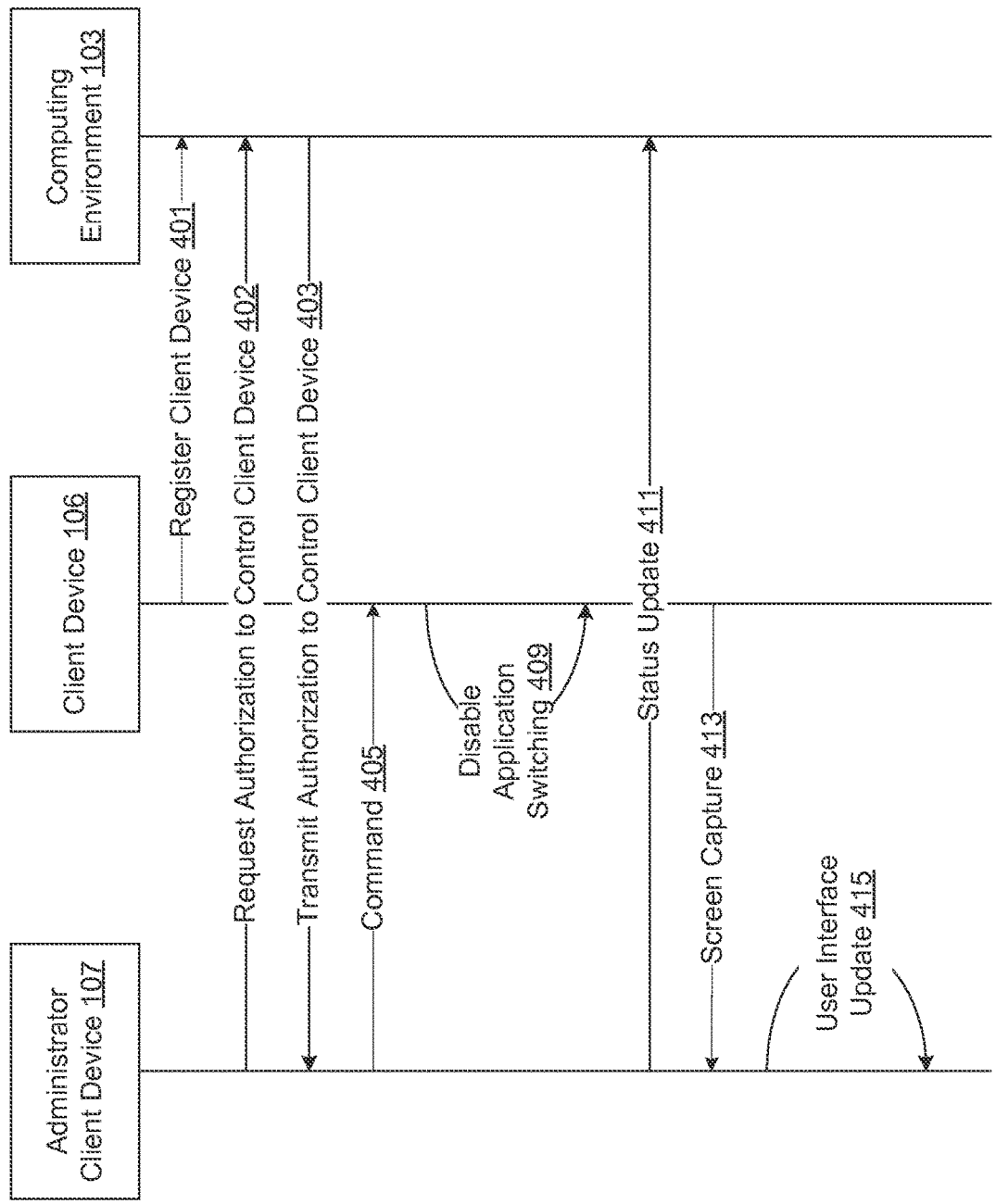
FIG. 4 is a sequence diagram illustrating interactions according to various examples.

Reference is now made to FIG. 4, which depicts a sequence diagram illustrating one example of interactions between a computing environment 103, client device 106 and an administrator client device 107. FIG. 4 illustrates an alternative example of a client device 106 obtaining a command 171 to place the client device 106 in a restricted mode. As denoted by step 401, the client device 106, using the client application 143, can transmit a request to register or enroll the client device 106 with the management service 119. As denoted by step 402, the administrator client device 107, using the administrator application 141, can transmit a request for authorization to control the client device 106. The request to control the client device 106 includes a request for authorization to place the client device 106 in a restricted mode. At step 403, the management service 119, upon authenticating the request from the administrator application 143, can transmit an authorization for the administrator application 143 to control the client device. As described above, the authorization can delegate the authority to enable or disable a restricted mode of a client device 106 to the administrator application 143.

At step 405, administrator application 143 can generate a command 171 instructing the client application 143 to place the client device 106 into the restricted mode. At step 409, the client application 143 can place the client device 106 into the restricted mode by disabling application switching capabilities of the client device 106. At step 411, the administrator application 143 can transmit a status update with respect to the client device 106 placed into the restricted mode. The status update can include an identity of the client device 106 that is placed into restricted mode. In some examples, the status update can also include a user identity of a user associated with the client device 106. The management service 119 can log or archive status updates received from the administrator client device 107.

At step 413, the client application 143 can transmit screen captures associated with data shown on a display of the client device 106 to the administrator application 143. The screen captures can be used to generate an administrator user interface in which the content displayed by a client device 106 can be monitored or viewed by an administrator. At step 415, the administrator application 143 can update the user interface displayed to an administrator user to reflect that the client device 106 has been placed into the restricted mode. Additionally, the administrator application 143 can provide screen capture data if the administrator user activates user interface elements requesting to view screen captures associated with the client device 106.

Figure 5:
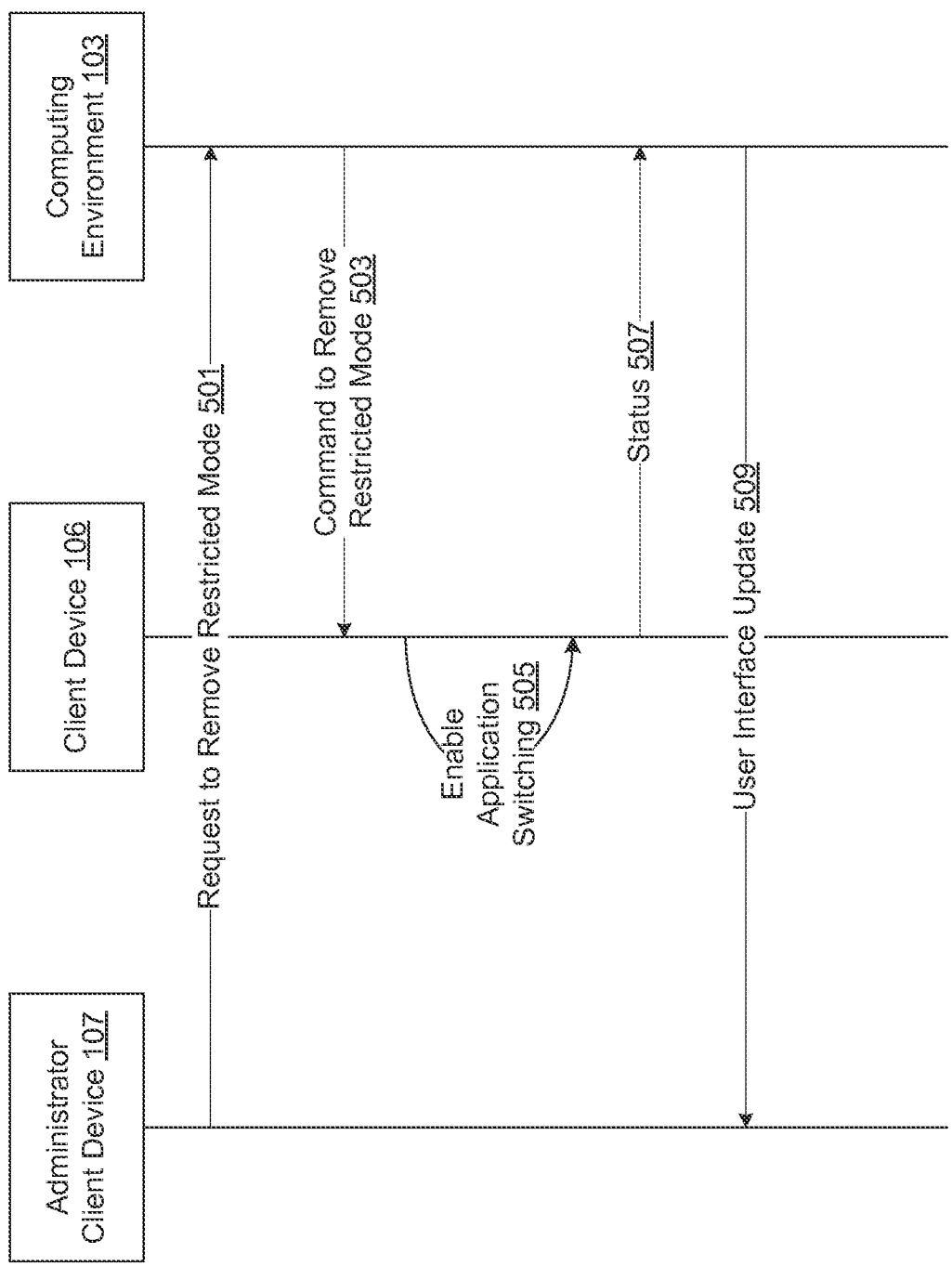
FIG. 5 is a sequence diagram illustrating interactions according to various examples.

Reference is now made to FIG. 5, which depicts a sequence diagram illustrating one example of interactions between a computing environment 103, client device 106 and an administrator client device 107. FIG. 5 illustrates an example of a client device 106 obtaining a command 171 to remove the client device 106 from a restricted mode. As denoted by step 501, the management service 119 can obtain a request to remove a particular client device 106 from a restricted mode from a user interface provided by the management console 123.

Next, at step 503, the management service 119 can transmit a command 171 to remove the client device 106 from the restricted mode to the client application 143 executed by the client device 106. In one scenario, the client application 143 can authenticate the command. At step 505, the client application 143 can remove the client device 106 from the restricted mode by enabling application switching capabilities of the client device 106 and ceasing screen capture transmission to the management service 119. At step 507, the client application 143 can transmit a status update corresponding to the client device 106 indicating that the client device 106 has been removed from the restricted mode. At step 509, the management service 119 can update a user interface provided via the management console 123 with an indication that the client device 106 has been removed from the restricted mode.

Figure 6:
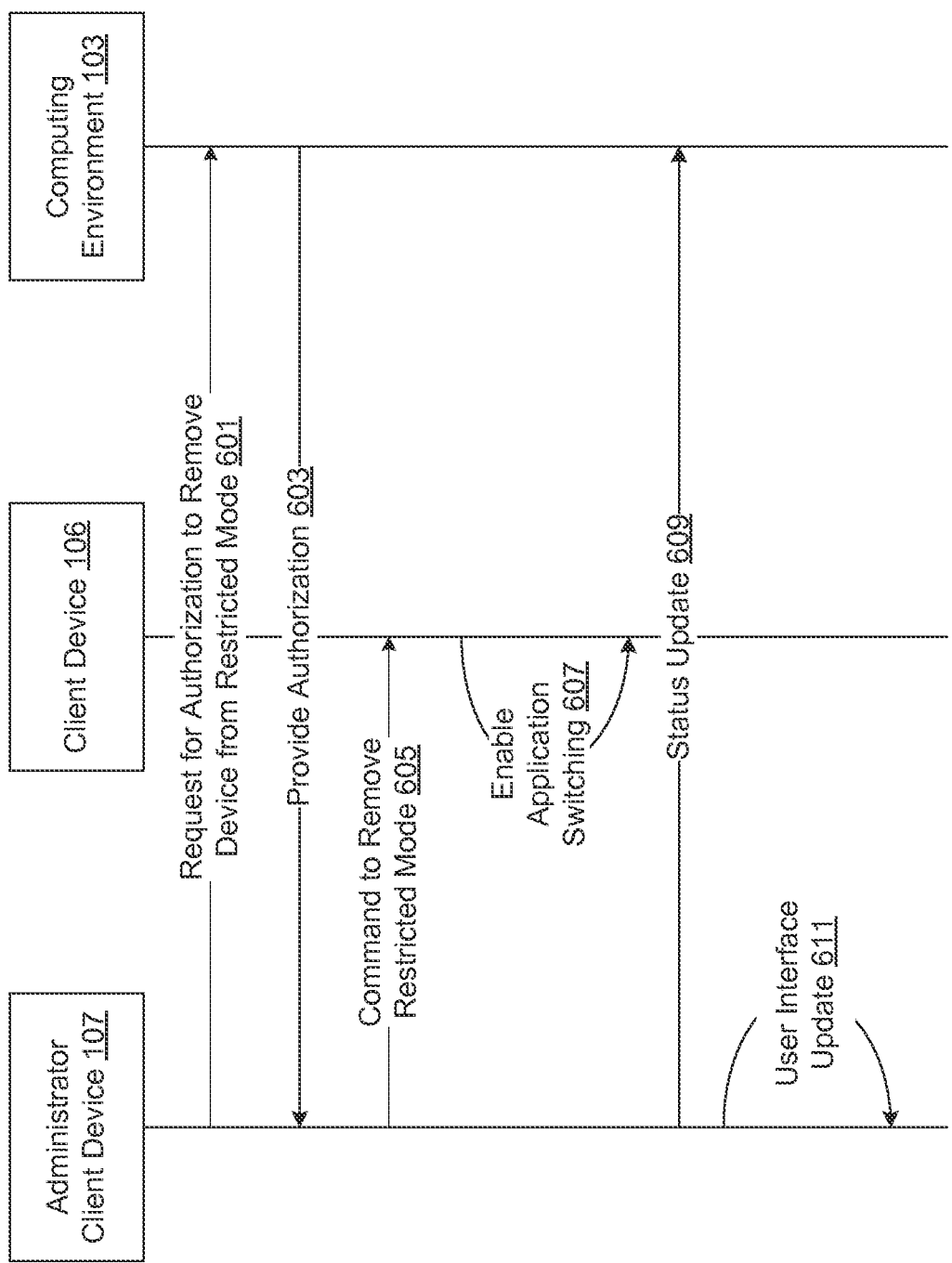
FIG. 6 is a sequence diagram illustrating interactions according to various examples.

Reference is now made to FIG. 6, which depicts a sequence diagram illustrating one example of interactions between a computing environment 103, client device 106 and an administrator client device 107. FIG. 6 illustrates an alternative example of a client device 106 obtaining a command 171 to remove the client device 106 from a restricted mode. As denoted by step 601, the management service 119 can obtain a request for authorization to remove a client device 106 from the restricted mode from an administrator application 141. In some examples, the administrator application 141 was previously delegated authorization to enable or disable a restricted mode of the client device 106. Therefore, obtaining another authorization as denoted by step 601 may not occur in all scenarios. At step 603, the administrator application 141 can receive the authorization to remove the client device 106 from the restricted mode upon authentication of the administrator client device 107 by the management service 119.

At step 605, the administrator application 141 can generate a command to remove a particular client device 106 from a restricted mode in response to an administrator issuing a request in a user interface provided by the administrator application 141. In one scenario, the client application 143 can authenticate the command. At step 607, the client application 143 can remove the client device 106 from the restricted mode by enabling application switching capabilities of the client device 106 and ceasing screen capture transmission to the administrator client device 107. At step 609, the administrator application 141 can transmit a status update with respect to the client device 106 removed from the restricted mode. The status update can include an identity of the client device 106 that is removed from the restricted mode. At step 611, the administrator application 141 can update a user interface with an indication that the client device 106 has been removed from the restricted mode, which can also include ceasing display of screen capture data associated with the client device 106.

Figure 7:
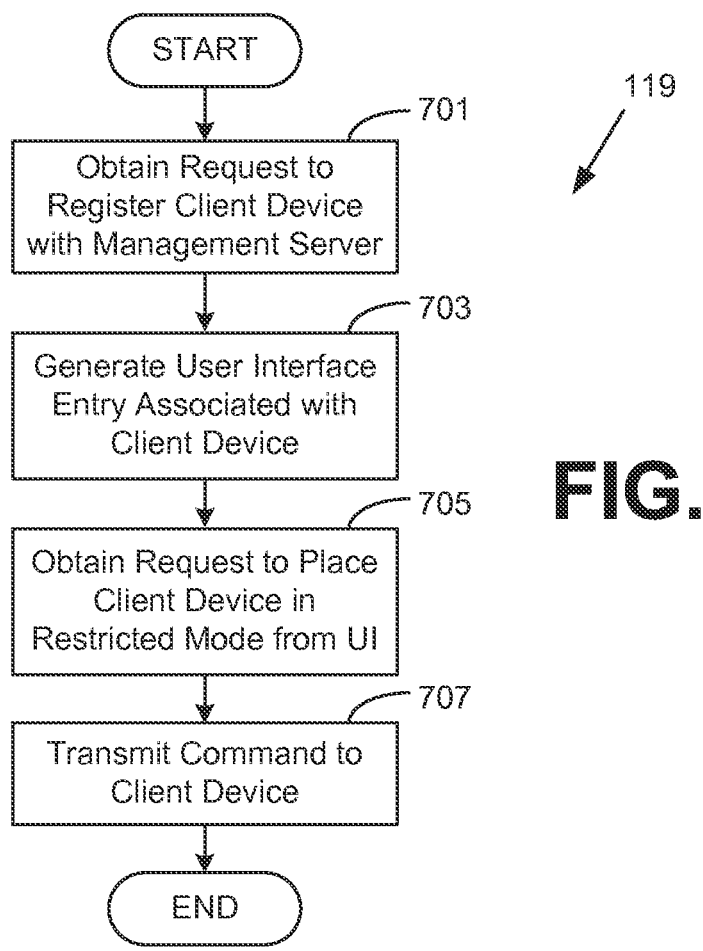
FIG. 7 is a flowchart illustrating an example of functionality implemented by the management service according to various examples.

Referring next to FIG. 7, shown is a flowchart that provides one example of the operation of a portion of the management service 119 according to various examples. Beginning at step 701, the management service 119 can obtain a request to register or enroll a particular client device 106 as a managed device that can be placed into a restricted mode by the management service 119. At step 703, the management service 119 can generate a user interface entry associated with the client device 106 in the management console 123. The user interface entry can identify the client device 106 or a user associated with the client device 106 that can be placed into a restricted mode by the management service 119 or the administrator application 141. At step 705, the management service 119 can obtain a request to place the client device 106 into a restricted mode via the management console 123 user interface that is displayed via the administrator client device 107.

In one scenario, the user interface can allow an administrator to place multiple devices into a restricted mode and initiate a command to execute a particular permitted application 135 at once. In other words, the user interface can provide the ability to generate a batch command to place multiple client devices 106 into a restricted mode at once. As another example, users or client devices 106 can be grouped according to a user group, classroom, exam, or any other type of category. Users or client devices 106 that are members of a group or category can inherit parameters associated with placing the client device 106 into the restricted mode from the group or category of which they are a member. For example, a teacher may have several different classrooms that can access different applications during test-taking. The teacher can group students based on the classroom and assign permissions and restrictions to the classroom as a group, and these permissions and restrictions can then be applied to the students belonging to that group. The permission and restrictions can vary from group to group. The teacher can also assign certain permissions to all groups. For example, the teacher can create a command that will restrict the internet access for all student devices in every group upon entry in a test-taking environment. This command will then be inherited by all sub-groups (e.g., every classroom), and the members within the sub-groups (e.g., the student devices). In this manner, the permissions and restrictions can be applied in a hierarchical fashion.

At step 707, the management service 119 can generate a command to place the selected client device 106 into the restricted mode and transmit the command to the client application 143 executed by the client device 106. Thereafter, the process can proceed to completion.

Figure 8:
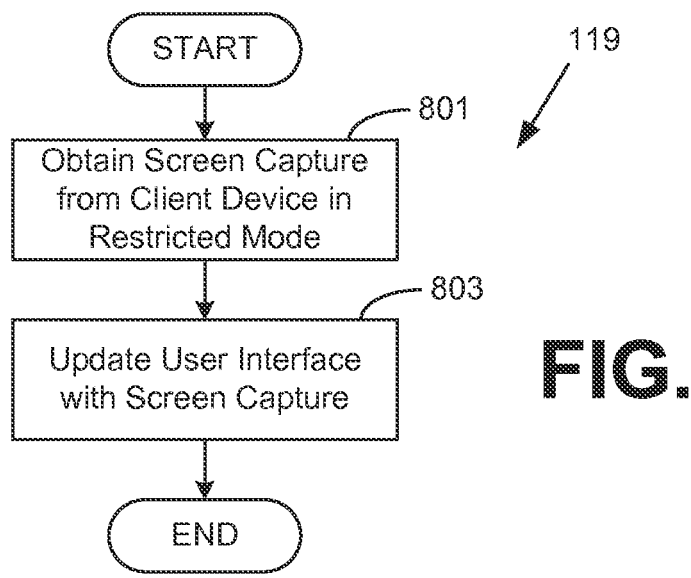
FIG. 8 is a flowchart illustrating an example of functionality implemented by the management service according to various examples.

With reference to FIG. 8, shown is a flowchart that provides an example of a portion of the operation of the management service 119 according to various examples. In particular, FIG. 8 provides an example of the management service 119 obtaining screen capture data from a client device 106 that has been placed into a restricted mode by the management service 119.

At step 801, the management service 119 can obtain screen capture data from the client application 143 executed by a client device 106 in a restricted mode. Screen capture data can be obtained periodically or as a video stream in real-time from the client device 106. As another example, screen capture data can be obtained only when a user interface in which screen capture data is shown is rendered. At step 803, the management service 119 can update a user interface provided via the management console 123 with the screen capture data, which facilitates monitoring of a display of the client device 106 by an administrator user, an instructor or a test proctor. Thereafter, the process can proceed to completion.

Figure 9:
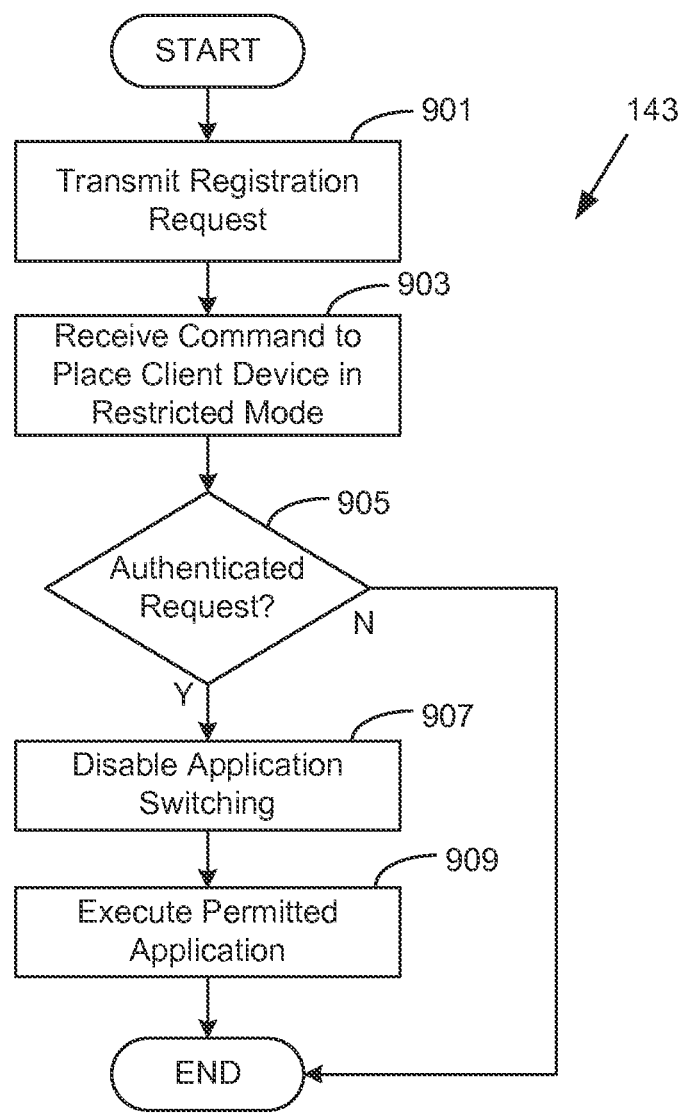
FIG. 9 is a flowchart illustrating an example of functionality implemented by the client application according to various examples.

With reference to FIG. 9, shown is a flowchart that provides an example of a portion of the operation of the client application 143 according to various examples. In particular. FIG. 9 provides an example of the client application 143 placing a client device 106 into a restricted mode in response to receiving a command to do so from the management service 119.

At step 901, the client application 143 can transmit a registration request to register the client device 106 as a managed device that can be placed into a restricted mode. At step 903, the client application 143 can receive a command to place the client device 106 into a restricted mode whereby application switching capabilities of the client device 106 are disabled. At step 905, the client application 143 can authenticate the command received from the management service 119 or administrator application 141. In one example, the client application 143 can determine whether a key or authentication credential is contained within the command received from the management service 119 or administrator application 141. If the request is not authenticated, the process proceeds to completion.

If the command is authenticated by the client application 143, then at step 907, the client application 143 can disable application switching capabilities of the client device 106. At step 909, the client application can execute a permitted application 135 identified by the command to place the client device 106 into the restricted mode. In this sense, the command received from the management service 119 can include a command to disable application switching capabilities of the client device 106 and a command to launch one or more permitted applications 135 identified by the command.

Figure 10:
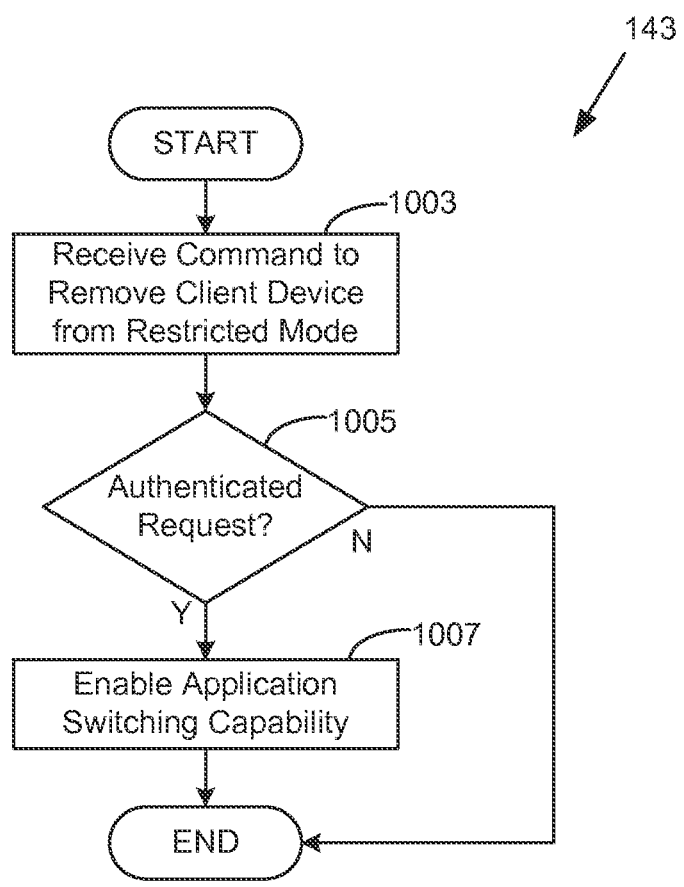
FIG. 10 is a flowchart illustrating an example of functionality implemented by the client application according to various examples.

With reference to FIG. 10, shown is a flowchart that provides an example of a portion of the operation of the client application 143 according to various examples. In particular, FIG. 7 provides an example of the client application 143 removing the client device 106 from a restricted mode in response to detecting presence of an administrator device 151 having the correct credentials in proximity to the client device 106.

At step 1003, the client device can receive a command 171 to remove the client device 106 from the restricted mode. At step 1005, the client application 143 can authenticate the command received from the management service 119. If the command is authenticated by the client application 143, then at step 1007, the client application 143 can enable application switching capabilities of the client device 106. Thereafter, the process can proceed to completion. If the command is not authenticated by the client application 143, the process proceeds to completion without enabling application switching capabilities of the client device 106.

Figure 11:
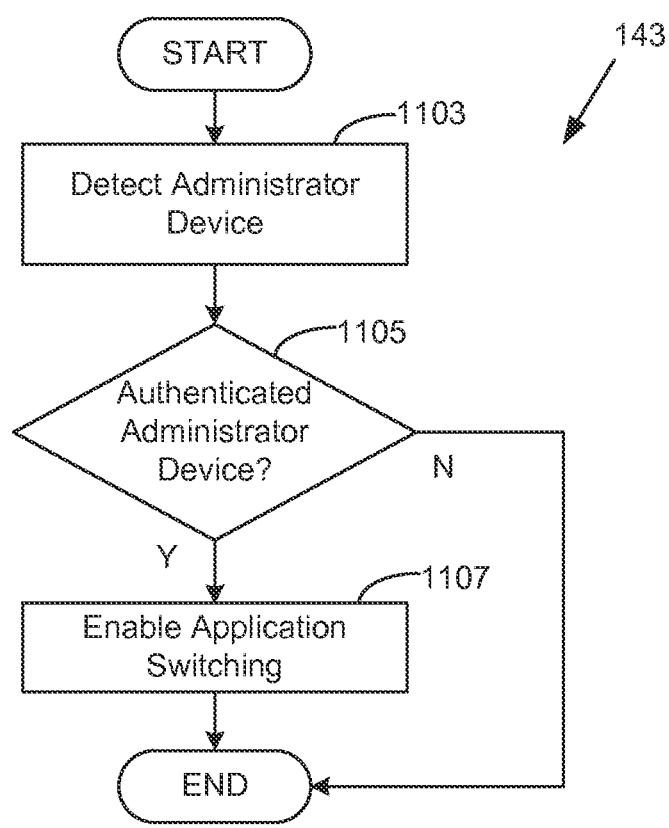
FIG. 11 is a flowchart illustrating an example of functionality implemented by the client application according to various examples.

With reference to FIG. 11, shown is a flowchart that provides an example of a portion of the operation of the client application 143 according to various examples. In particular, FIG. 11 provides an example of the client application 143 removing the client device 106 from a restricted mode in response to receiving a command to do so from the management service 119. At step 1103, the client application 143 can detect presence of the administrator device 151 in proximity to the client device 106. In one example, such proximity can be detected by detecting a peripheral device insertion event from an operating system executed by the client device 106, such as a USB insertion event. Proximity can also be detected via Bluetooth, NFC, or scanning of a QR code presented by the administrator device 151.

Next, at step 1105, the client application 143 can detect whether the administrator device 151 is authenticated. As one example, the client application 143 can determine whether a particular file stored at a predetermined location on the administrator device 151 contains a particular password or authentication credential for which the client device 106 is configured to search. In one scenario, the administrator device 151 can be used to unlock or remove the client device 106 from the restricted mode in the event that network accessibility of the client device 106 is impaired. If the administrator device 151 is authenticated, then at step 1107, the client application 143 enables application switching capabilities of the client device 106 and the process proceeds to completion. If the administrator device is not authenticated at step 1105, the process proceeds to completion without enabling application switching capabilities of the client device 106.

Figure 12:
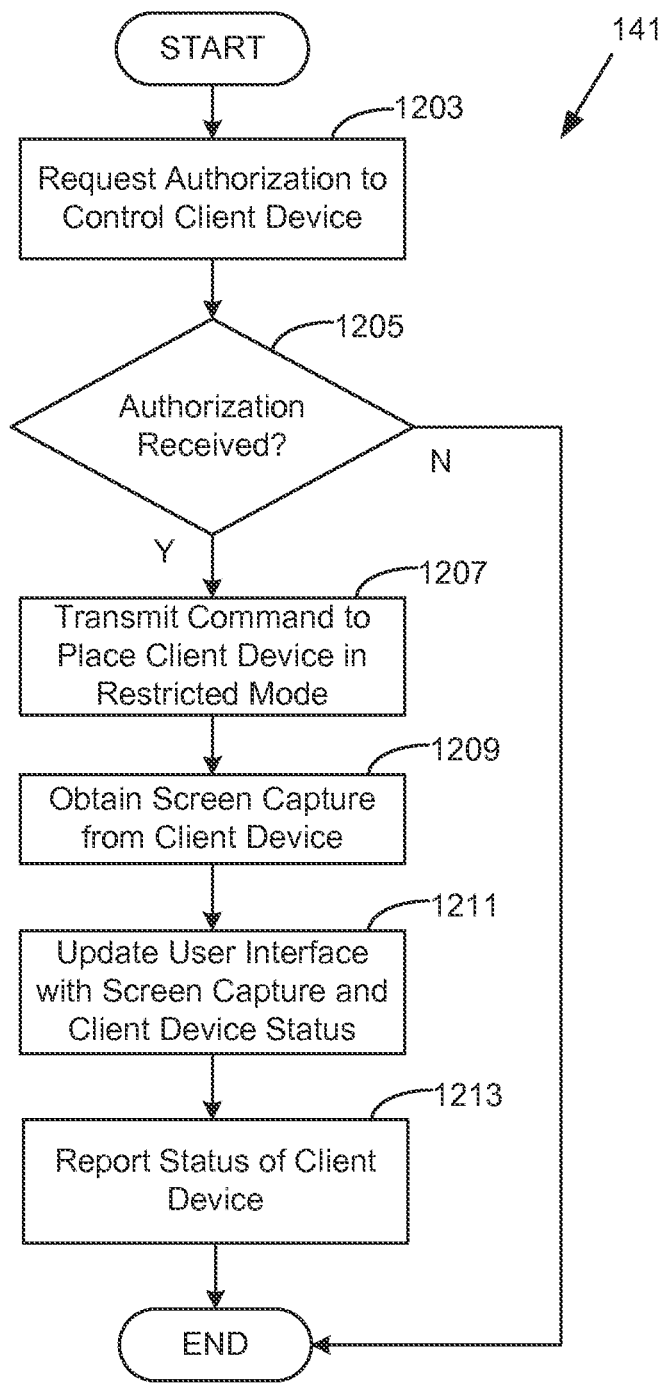
FIG. 12 is a flowchart illustrating an example of functionality implemented by the administrator application according to various examples.

With reference to FIG. 12, shown is a flowchart that provides an example of a portion of the operation of the administrator application 141 according to various examples. In particular, FIG. 12 provides an example of the administrator application 141 placing a client device 106 in a restricted mode. At step 1203, the administrator application 141 can request authorization to control a client device 106 from the management service 119. The client device 106 can be registered with the management service 119 and the client application 143 can be installed on the client device 106. The administrator application 141 can submit an identity of the client device 106 and/or an identity of a user associated with the client device 106 to the management service 119 to request authorization to control the client device 106. Upon authentication of the administrator application 141, the management service can respond to the administrator application 141 with an authorization to control the client device 106. In other words, the management service 119 can delegate the authority to place a client device 106 into a restricted mode to the administrator application 141.

The authorization from the management service 119 can include an authentication credential, such as a key, a username/password pair, or another form of credential. At step 1205, the administrator application 141 determines whether authorization to control the client device 106 is received from the management service 119. If not, the process proceeds to completion without placing the client device 106 into a restricted mode. Otherwise, at step 1207, the administrator application 141 can transmit a command 171 to place the client device 106 into a restricted mode that disables application switching capabilities of the client device 106. At step 1209, the administrator application 141 can obtain screen capture data from the client device 106 that has been placed into the restricted mode. As noted above, the screen capture data can include image captures or video capture data corresponding to what is displayed by the client device 106. At step 1211, the administrator application 141 can update an administrator user interface with the screen capture data received from the client device 106. At step 1313, the administrator application 141 can report the status of the client device 106 to the management service 119 for logging. Thereafter, the process can proceed to completion.

Figure 13:
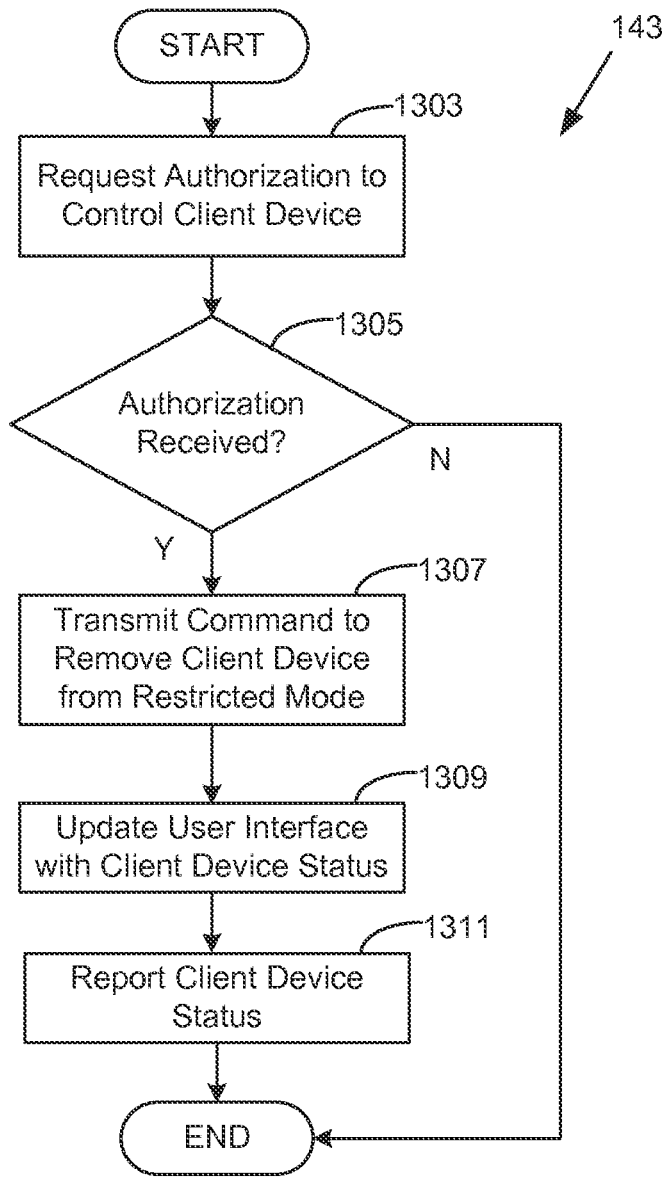
FIG. 13 is a flowchart illustrating an example of functionality implemented by the administrator application according to various examples.

With reference to FIG. 13, shown is a flowchart that provides an example of a portion of the operation of the administrator application 141 according to various examples. In particular, FIG. 13 provides an example of the administrator application 141 removing a client device 106 from a restricted mode. At step 1303, the administrator application 141 can request authorization to control a client device 106 from the management service 119. In some examples, the management service 119 may have previously delegated the authority to control the client device 106 to the administrator application 141. In this scenario, the administrator application 141 need not request authorization to control the client device 106 an additional time. At step 1305, the administrator application 141 can determine whether authorization to control the client device 106 is received or has previously been received from the management service 119.

As noted above, the authorization from the management service 119 can include an authentication credential, such as a key, a username/password pair, or another form of credential. If authorization is not received, the process can proceed to completion. At step 1307, the administrator application 141 can transmit a command 171 to remove the client device 106 from the restricted mode. The command 171 to remove the client device 106 from the restricted mode causes the client application 143 to enable application switching capabilities of the client device 106 and cease transmission of screen capture data to the administrator application 141 or management service 119. At step 1309, the administrator application 141 can update an administrator user interface to reflect that the client device 106 is no longer in the restricted mode. At step 1311, the administrator application 141 can report the status of the client device 106 to the management service 119 for logging. Thereafter, the process can proceed to completion.

The flowcharts of FIGS. 7-13 show examples of the functionality and operation of implementations of components described herein. The components described herein can be embodied in hardware, software, or a combination of hardware and software. If embodied in software, each element may represent a module of code or a portion of code that comprises program instructions to implement the specified logical function(s). The program instructions may be embodied in the form of, for example, source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts show a specific order of execution, it is understood that the order of execution may differ from that which is shown. For example, the order of execution of two or more elements may be switched relative to the order shown. Also, two or more elements shown in succession may be executed concurrently or with partial concurrence. Further, in some examples, one or more of the elements shown in the flowcharts may be skipped or omitted.

The computing environment 103, the client device 106, the administrator client device 107, and/or other components described herein may each include at least one processing circuit. Such a processing circuit may comprise, for example, one or more processors and one or more storage devices that are coupled to a local interface. The local interface may comprise, for example, a data bus with an accompanying address/control bus or any other suitable bus structure.

The one or more storage devices for a processing circuit may store data and/or components that are executable by the one or more processors of the processing circuit. For example, the management service 119, the client application 143 and/or other components may be stored in one or more storage devices and be executable by one or more processors. Also, a data store, such as the data store 116 may be stored in the one or more storage devices.

The management service 119, the client application 143 and/or other components described herein may be embodied in the form of hardware, as software components that are executable by hardware, or as a combination of software and hardware. If embodied as hardware, the components described herein can be implemented as a circuit or state machine that employs any suitable hardware technology. The hardware technology may include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium may contain, store, and/or maintain the software or program instructions for use by or in connection with the instruction execution system.

A computer-readable medium can comprise a physical media, such as, magnetic, optical, semiconductor, and/or other suitable media. Examples of a suitable computer-readable media include, but are not limited to, solid-state drives, magnetic drives, or flash memory. Further, any logic or component described herein may be implemented and structured in a variety of ways. For example, one or more components described may be implemented as modules or components of a single application. Further, one or more components described herein may be executed in one computing device or by using multiple computing devices.

It is emphasized that the above-described examples of the present disclosure are merely examples of implementations to set forth for a clear understanding of the principles of the disclosure. Many variations and modifications may be made to the above-described examples without departing substantially from the spirit and principles of the disclosure. All such modifications and variations are intended to be included herein within the scope of this disclosure.

The invention claimed is:

1. A method comprising:
   obtaining, by at least one computing device executing a management service, a request to register a client device, the request received from a client application;
   generating in a user interface within a management console, by the at least one computing device, an entry associated with the client device;
   obtaining, from the user interface associated with the management console, a request to place the client device in a restricted mode that disables an application switching capability of the client device;

generating, by the at least one computing device, a command to place the client device in the restricted mode, wherein the command causes the client device to edit a system registry associated with an operating system of the client device to disable the application switching capability of the client device, wherein to edit the system registry associated with the operating system of the client device to disable the application switching capability of the client device comprises an instance in which a feature of the operating system is disabled that allows at least one application that is executing in a foreground on the client device to be changed; and transmitting, from the at least one computing device, the command to the client device to place the client device in the restricted mode, the command identifying at least one permitted application executable by the client device while the client device is in the restricted mode in the instance in which the feature is disabled.

2. The method of claim 1, wherein the restricted mode that disables the application switching capability further comprises disabling a file explorer or a task manager associated with the operating system of the client device.

3. The method of claim 1, further comprising:
obtaining, from the client device, a screen capture associated with a display of the client device; and
generating, by the at least one computing device, a representation of the screen capture in the user interface.

4. The method of claim 1, further comprising:
obtaining, through the user interface in the management console, a request to remove the client device from the restricted mode;
generating, by the at least one computing device, a removal command to remove the client device from the restricted mode; and
transmitting, from the at least one computing device, the removal command to the client device, wherein the client device is configured to enable an application switching capability of the client device in response to receiving the removal command.

5. The method of claim 1, further comprising:
generating, by the at least one computing device, an administrator password associated with the client device, wherein the administrator password facilitates removal of the client device from the restricted mode; and
transmitting, by the at least one computing device, the administrator password to an administrator device.

6. The method of claim 5, wherein the administrator device comprises a removable storage device in communication with the at least one computing device.

7. The method of claim 1, wherein the at least one permitted application comprises a browser application.

8. The method of claim 7, wherein the command identifies a whitelist comprising at least one network address-accessible by the browser application.

9. A non-transitory computer-readable medium embodying a program, when executed by a client device, the program causes the client device to at least:
generate a request to register the client device in a restricted mode, wherein the request comprises an identifier associated with the client device;
transmit the request to a management service accessible over a network;
obtain a command to place the client device in the restricted mode from the management service, the command identifying a permitted application that is allowed to be executed while the client device is in the restricted mode;
disable an application switching capability by editing a system registry associated with an operating system of the client device, wherein to disable the application switching capability by editing the system registry comprises an instance in which a feature of the operating system is disabled that allows at least one application that is executing in a foreground on the client device to be changed;
enter the restricted mode in the instance in which the feature is disabled; and
execute the permitted application identified by the command to place the client device in the restricted mode.

10. The non-transitory computer-readable medium of claim 9, wherein the program is further configured to cause the client device to disable a task manager executed by the operating system of the client device in response to receiving the command to place the client device in the restricted mode.

11. The non-transitory computer-readable medium of claim 9, wherein the program is further configured to cause the client device to disable a file explorer executed by the operating system of the client device.

12. The non-transitory computer-readable medium of claim 9, wherein the program is further configured to cause the client device to execute the permitted application in a full screen mode on the client device.

13. The non-transitory computer-readable medium of claim 9, wherein the program is further configured to cause the client device to:
detect an administrator device in proximity to the client device;
determine whether the administrator device is authorized to cause removal of the client device from the restricted mode; and
remove the client device from the restricted mode in response to determining that the administrator device is authorized.

14. The non-transitory computer-readable medium of claim 13, wherein the program causes the client device to detect an administrator device in proximity to the client device by detecting coupling of a removable storage device with the client device.

15. A system comprising:
a client device executing a client application; and
a computing environment executing a management service, the computing environment in communication with the client device over a network, wherein the client device is configured to:
generate a request to register the client device in a restricted mode, wherein the request originates from the client application;
transmit the request to the management service;
obtain a command to place the client device in the restricted mode, the command being received from the management service and the command specifying a permitted application that is allowed to be executed while the client device is in the restricted mode;
disable an application switching capability by editing a system registry associated with an operating system of the client device, wherein to disable the application switching capability by editing the system registry comprises an instance in which a feature of the operating system is disabled that allows at least one application that is executing in a foreground on the client device to be changed;

enter the restricted mode in the instance in which the feature is disabled; and execute the permitted application identified by the command while the client device is in the restricted mode.

16. The system of claim 15, wherein the client device is configured to execute the client application upon startup of the client device.

17. The system of claim 15, wherein the client device is further configured to execute the client application in an administrator mode, wherein the administrator mode is associated with an authority to disable the application switching capability.

18. The system of claim 15, wherein the client device disables the application switching capability by disabling at least one of a task manager, a shell executable by the client device, or a file explorer executable by the client device.

19. The system of claim 15, wherein the client device is further configured to enable the application switching capability in response to receiving, from the management service, a command to remove the client device from the restricted mode.

20. The system of claim 15, wherein:

the command comprises a key or an authentication credential; and the client device is further configured to:
authenticate the command based at least in part on the key or the authentication credential.

* * * * *